United States Patent [19]
Herrick et al.

[11] Patent Number: 6,030,159
[45] Date of Patent: Feb. 29, 2000

[54] MULTIPURPOSE CARGO TIE DOWN SYSTEM

[75] Inventors: William H. Herrick, Livonia; James E. Tester, Novi; Edward J. Maurus, Westland, all of Mich.

[73] Assignee: AAR Corp., Wood Dale, Ill.

[21] Appl. No.: 08/902,121

[22] Filed: Jul. 29, 1997

[51] Int. Cl.[7] ........................................ B60P 7/08
[52] U.S. Cl. .................. 410/102; 410/101; 410/105; 410/111
[58] Field of Search .................... 410/101, 102, 410/104, 105, 106, 107, 111, 116; 24/265 CD, 115 K; 248/499; 244/118.1, 137.1

[56] References Cited

U.S. PATENT DOCUMENTS

| | | | |
|---|---|---|---|
| 2,422,693 | 6/1947 | McArthur | 410/116 |
| 2,688,289 | 9/1954 | Sterling | 410/104 |
| 3,212,457 | 10/1965 | Looker | 410/105 |
| 3,241,500 | 3/1966 | Simpson et al. | 410/111 |
| 3,709,156 | 1/1973 | Bowers | 410/111 |
| 4,000,870 | 1/1977 | Davies | 244/118.1 |
| 4,230,432 | 10/1980 | Howell | 410/102 |
| 4,630,982 | 12/1986 | Fenner | 410/101 X |
| 4,645,392 | 2/1987 | Takaguchi | 410/101 X |
| 4,850,769 | 7/1989 | Matthews | 410/105 |
| 5,609,240 | 3/1997 | Moradians | 244/137.1 X |
| 5,674,033 | 10/1997 | Ruegg | 410/104 |
| 5,774,948 | 7/1998 | Petschke et al. | 410/101 X |

FOREIGN PATENT DOCUMENTS

| | | | |
|---|---|---|---|
| 995634 | 6/1965 | United Kingdom | 24/265 CD |

OTHER PUBLICATIONS

AAR Foundation Track Drawing C52599, 1 page, 1996.

*Primary Examiner*—Stephen T. Gordon
*Attorney, Agent, or Firm*—Lee, Mann, Smith, McWilliams, Sweeney & Ohlson

[57] ABSTRACT

A cargo tie down system for use in securing either containerized cargo or a containerized cargo conveyance system to a transport vehicle. The cargo tie down system includes a cargo tie down adapter having a housing and a cargo ring coupled to the housing for use in tying down noncontainerized cargo. The cargo tie down system also includes a mounting apparatus adapted to be attached to the containerized cargo conveyance system that includes a selectively rotatable stud having a head with outwardly extending wings. The housing includes a receptacle adapted to selectively receive and retain the stud of the mounting apparatus to secure the containerized cargo conveyance system to the transport vehicle when containerized cargo is to be transported without requiring removal of the cargo ring.

16 Claims, 3 Drawing Sheets

FIG. 1
PRIOR ART
FIG. 2
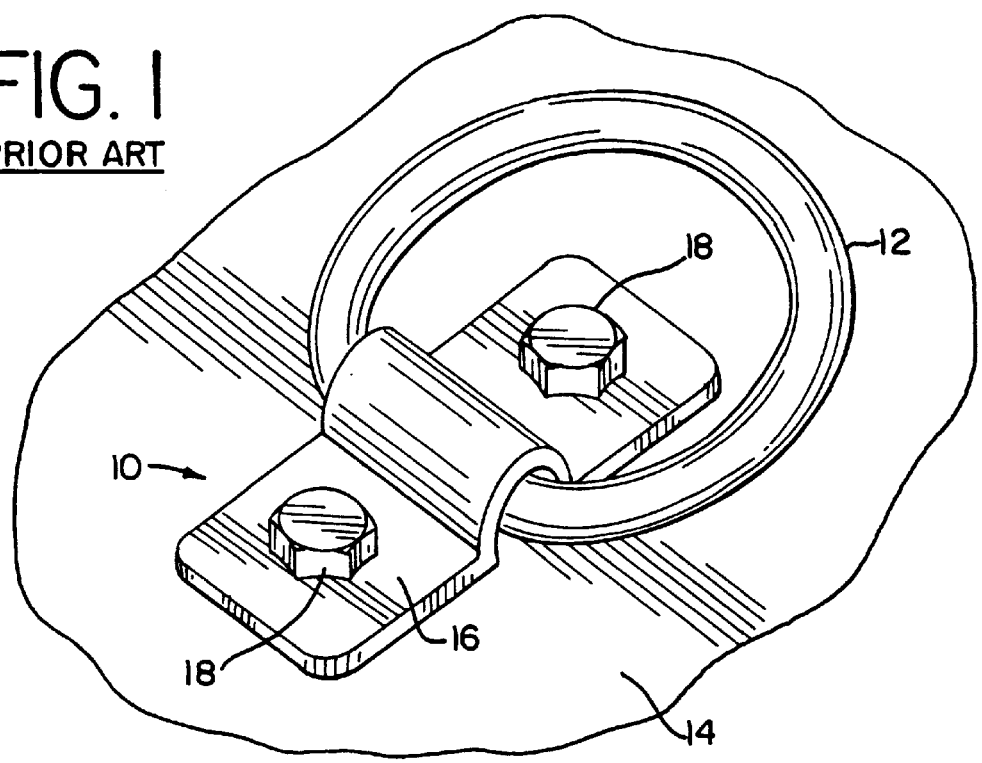
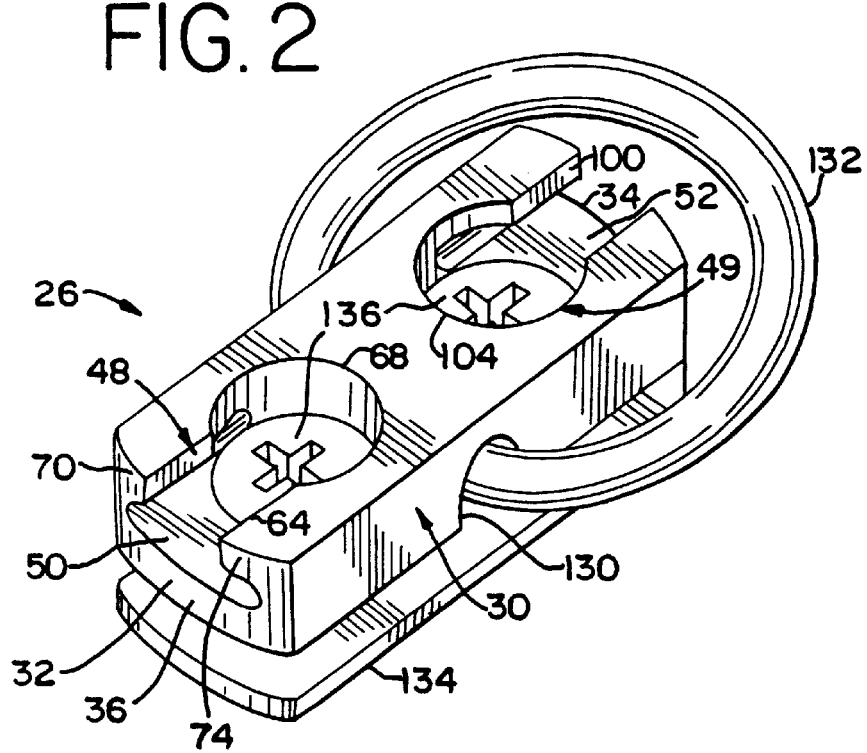

MULTIPURPOSE CARGO TIE DOWN SYSTEM

BACKGROUND OF THE INVENTION

The present invention provides a multipurpose cargo tie down system including a cargo tie down adapter having a housing adapted to be secured to a transport vehicle and a cargo ring coupled to the housing to provide a tie down for noncontainerized cargo, and a mounting apparatus adapted to be attached to a containerized cargo conveyance system, the housing including a receptacle adapted to receive and selectively attach the mounting apparatus and the cargo conveyance system to the housing without requiring removal of the cargo ring.

Transport vehicles, such as cargo airplanes, are used to transport noncontainerized cargo such as combat ground vehicles. Cargo rings are typically secured to the deck of the airplane for use in tying down the noncontainerized cargo to the deck to restrain movement within the airplane. In addition to carrying noncontainerized cargo, cargo airplanes also carry containerized cargo in unitized containers or unit load devices. Containerized cargo requires a conveyance system for loading and unloading the containerized cargo within the airplane.

Cargo rings are currently attached to the deck of cargo airplanes by a strap and two bolts extending through the strap into the deck of the airplane. When containerized cargo is to be transported by the cargo airplane, all of the cargo rings must be removed from the deck of the airplane prior to the installation of the containerized cargo conveyance system. Many man hours are required to remove hundreds of bolts that fasten the cargo rings to the deck of the airplane. Many more man hours are then required to bolt down the containerized cargo conveyance system in the locations where the cargo rings were previously located. Not only are many man hours required to remove all of the bolts for the cargo rings and to install all of the bolts for the containerized cargo conveyance system, but the installers must also contend with different sizes of bolts at random locations.

The present invention provides a cargo tie down adapter that is adapted to be secured to the deck of a transport vehicle such as a cargo airplane. The adapter includes a cargo ring to provide a tie down for noncontainerized cargo such as ground vehicles and also includes a housing including a receptacle having a dovetail slot and a retention cavity for attaching modular containerized cargo conveyance system hardware to the housing. The presence of the dovetail slot and retention cavity in the housing of the cargo tie down adapter eliminates the need to remove the cargo rings during installation of the containerized cargo conveyance system. The cargo rings that are mounted to the deck of the cargo airplane as part of the cargo tie down adapter never need to be removed. Many man hours are thus saved when switching the cargo airplane from a noncontainerized cargo carrier to a containerized cargo carrier and back again.

SUMMARY OF THE INVENTION

A cargo tie down system for use in securing noncontainerized cargo or a containerized cargo conveyance system to a transport vehicle such as an airplane. The cargo tie down system includes a cargo tie down adapter and a mounting apparatus. The cargo tie down adapter includes a housing having a base wall adapted to be connected to the transport vehicle, a top wall spaced apart from the base wall, and a receptacle including a cavity formed between the base wall and the top wall and a key-hole shaped slot formed in the top wall that provides communication with the cavity. The top wall includes a first lip member and a second lip member located on opposing sides of the slot. The cavity includes a first recess located between the base wall and the first lip member and a second recess located between the base wall and the second lip member. The base wall includes a groove extending across the width of the housing that is adapted to receive a cargo tie down member such as a cargo ring. The cargo ring provides a tie down for noncontainerized cargo carried by the transport vehicle.

The mounting apparatus is adapted to be attached to the containerized cargo conveyance system and includes a selectively rotatable stud. The stud includes a head having a pair of wings that extend outwardly in opposite radial directions from the rotational axis of the stud. The stud is rotatable approximately 90° between a first unlocked position and a second locked position. The head of the stud is adapted to be inserted through the slot of the housing and into the cavity of the housing when the stud is in the first unlocked position. Thereafter the stud is rotated approximately 90° to the second locked position wherein the wings of the head of the stud are interlocked with the first and second lips of the top wall of the housing to thereby selectively attach the stud of the mounting apparatus and the containerized cargo conveyance system to the housing without removal of the cargo ring from the housing.

BRIEF DESCRIPTION OF THE DRAWING FIGURES

FIG. 1 shows a prior art cargo ring attached to a transport vehicle.

FIG. 2 shows the cargo tie down adapter of the present invention and a shim for adjusting the elevation of the cargo tie down adapter.

DETAILED DESCRIPTION OF THE PREFERRED EMBODIMENT

Figure 3:
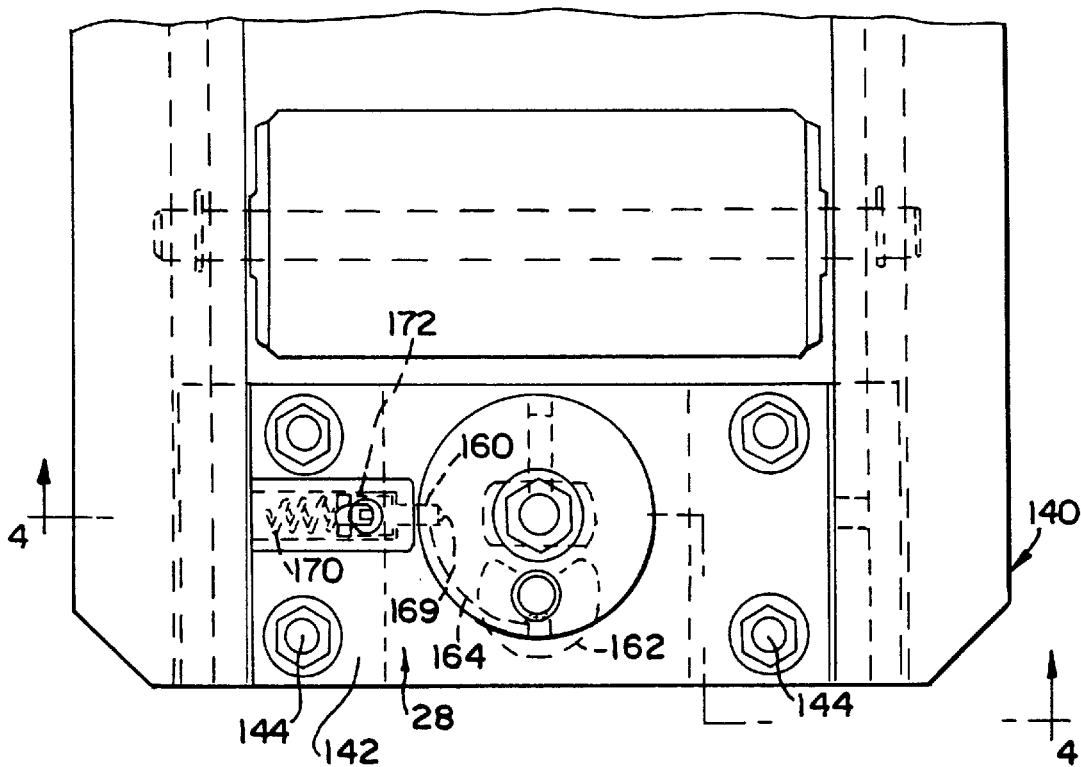
FIG. 3 is a top plan view of the cargo tie down system of the present invention shown attaching a containerized cargo conveyance system to the transport vehicle.

FIG. 1 shows a prior art tie down device 10 that is presently used in transport vehicles such as cargo airplanes. The tie down device 10 includes a cargo ring 12 that is attached to the deck 14 of the transport vehicle by a strap 16 and a pair of bolts 18. In a C130 cargo airplane the bolts 18 are located approximately 1.30 inches apart from one another. The tie down device 10 is used to tie down noncontainerized cargo such as combat ground vehicles to the deck 14 of the transport vehicle to prevent movement of the cargo during transport. When containerized cargo is to be transported in the transport vehicle, the tie down device 10 must be removed from the deck 14 by the manual removal of the bolts 18. A containerized cargo conveyance system is then bolted to the deck 14 in the locations where the tie down devices 10 were previously located.

Figure 4:
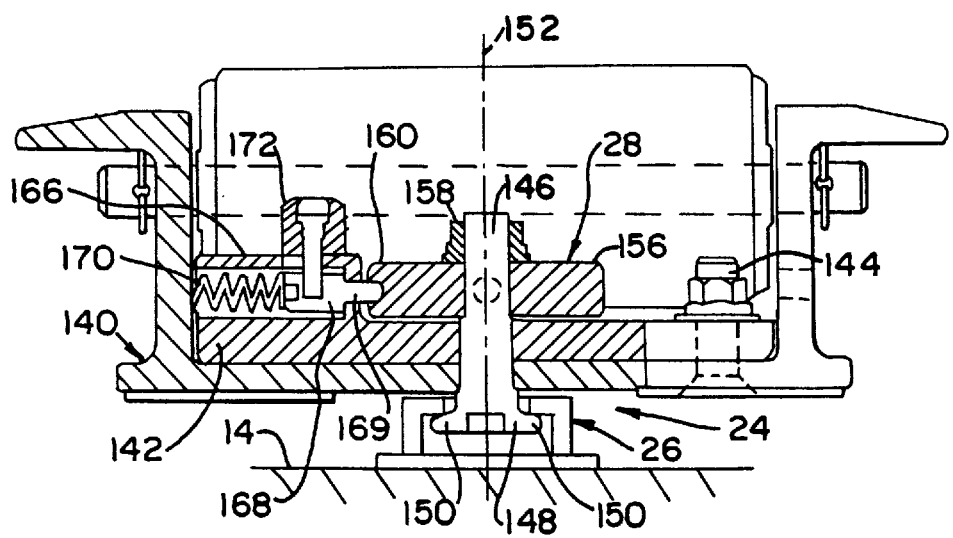
FIG. 4 is a cross sectional view taken along lines 4—4 of FIG. 3 showing the stud of the mounting assembly in the locked position within the receptacle of the housing of the cargo tie down adapter.
Figure 5:
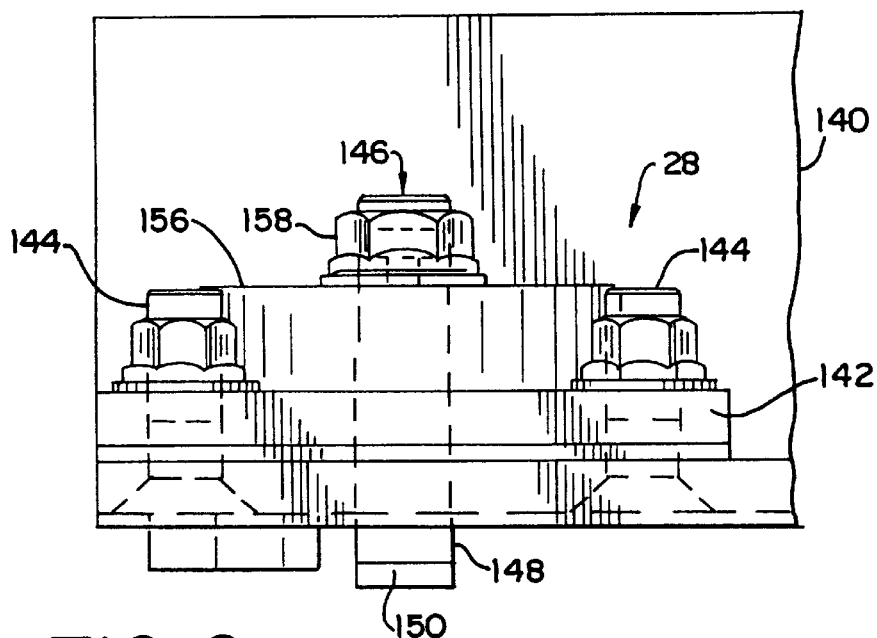
FIG. 5 is a partial side elevational view of the mounting apparatus of the cargo tie down system with the stud in the locked position.

The cargo tie down system 24 of the present invention includes a cargo tie down adapter 26, as best shown in FIG. 2, and a containerized cargo conveyance system mounting assembly 28 as best shown in FIGS. 3–5. As shown in FIGS. 2 and 6–8, the cargo tie down adapter 26 includes a housing 30. The housing 30 extends longitudinally between a first end 32 and a second end 34. The housing 30 includes a base wall 36 having a bottom surface 38 and an interior surface 40. The base wall 36 extends from the first end 32 to the second end 34 of the housing 30. The housing 30 also includes a top wall 42 that is spaced apart from the base wall 36. The top wall 42 includes a top surface 44 and an interior surface 46. The top wall 42 extends coextensively with the base wall 36. The housing 30 includes a first receptacle 48 including a first cavity 50 located between the top wall 42 and the base wall 36 at the first end 32 of the housing 30, and a first slot 64 located in the top wall 42. The housing 30 also includes a second receptacle 49 including a second cavity 52 located between the top wall 42 and the base wall 36 at the second end 34 of the housing 30, and a second slot 100 located in the top wall 42. An aperture 54 located in an end wall surface 56 at the first end 32 of the housing 30 is in communication with the first cavity 50. An aperture 58 located in an end wall surface 60 at the second end 34 of the housing 30 is in communication with the second cavity 52.

Figure 6:
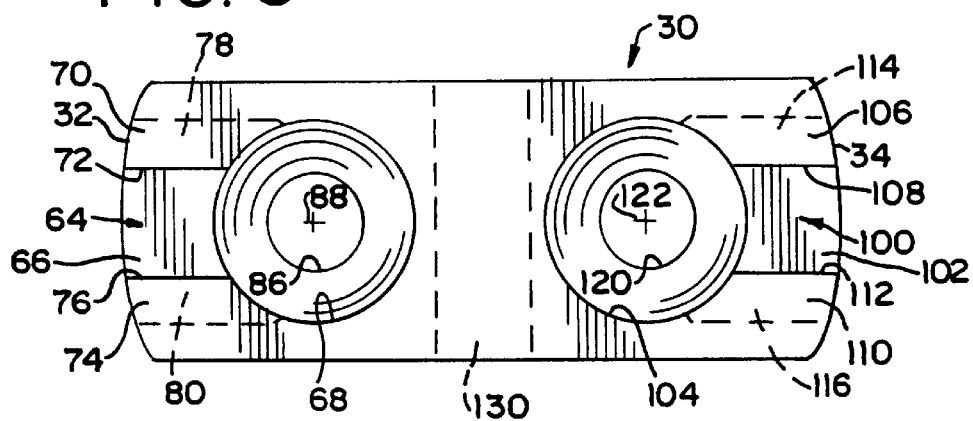
FIG. 6 is a top plan view of the housing of the cargo tie down adapter.

The first slot 64 in the top wall 42 of the housing 30 is located at the first end 32. The slot 64 extends through the top wall 42 and provides communication with the first cavity 50. The first slot 64 includes a generally rectangular portion 66 that extends through the end wall surface 56 and a generally circular portion 68 located toward the middle portion of the housing 30. The diameter of the circular portion 68 of the first slot 64 is approximately equal to the width of the first cavity 50. As shown in FIGS. 2 and 6, the first slot 64 is generally in the shape of a key-hole. The receptacle 48 includes a first lip member 70 having an edge 72 and a spaced apart second lip member 74 having an edge 76 located in the top wall 42. The lip members 70 and 74 are spaced apart from one another by the rectangular portion 66 of the first slot 64. The edges 72 and 76 of the first and second lip members 70 and 74 are generally parallel to one another. The first cavity 50 includes a first recess portion 78 located between the first lip member 70 and the base wall 36. The first cavity 50 also includes a second recess portion 80 located between the second lip member 74 and the base wall 36.

The base wall 36 includes a first bore 86 that is generally concentrically located below the circular portion 68 of the first slot 64 about a common central vertical axis 88. The bore 86 includes a conical portion 90 that extends downwardly and inwardly from the interior surface 40 of the base wall 36 and a cylindrical portion 92 that extends from the conical portion 90 to the bottom surface 38 of the base wall 36.

The second slot 100 in the top wall 42 of the housing 30 is located at the second end 34 of the housing 30, extends through the top wall 42 and provides communication with the second cavity 52. The second slot 100 includes a rectangular portion 102 that extends through the end wall surface 60 and a generally circular portion 104 located toward the middle portion of the housing 30 such that the second slot 100 is generally key-hole shaped. The receptacle 49 includes a third lip member 106 having an edge 108 and a spaced apart fourth lip member 110 having an edge 112 located in the top wall 42. The lip members 106 and 110 are located on opposite sides of the rectangular portion 102 of the second slot 100. The edges 108 and 112 of the third and fourth lip members 106 and 110 are generally parallel to one another. The second cavity 52 includes a third recess portion 114 located between the third lip member 106 and the base wall 36 and a fourth recess portion 116 located between the fourth lip member 110 and the base wall 36. The second slot 100 is configured substantially identical to the first slot 64.

The base wall 36 includes a second bore 120 that is located generally concentrically below the circular portion 104 of the second slot 100 about a common central vertical axis 122. The second bore 120 includes a conical portion 124 that extends downwardly and inwardly from the interior surface 40 of the base wall 36 and a cylindrical portion 126 that extends from the conical portion 124 to the bottom surface 38 of the base wall 36. The axes 88 and 122 are preferably located at the same spacing as the bolts 18 of the tie down device 10, which the cargo tie down adapter 26 replaces.

Figure 7:
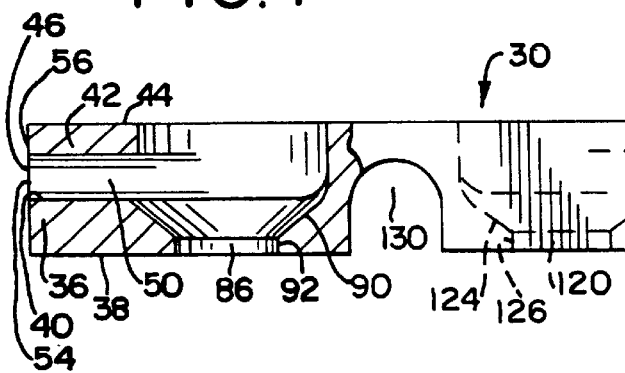
FIG. 7 is a side elevational view of the housing of the cargo tie down adapter shown partially in cross section.
Figure 8:
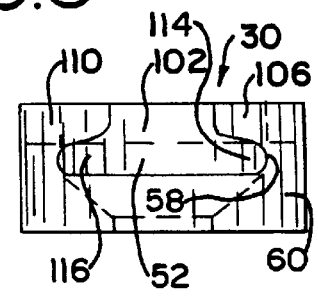
FIG. 8 is an end view of the housing of a cargo tie down adapter.

As best shown in FIGS. 6 and 7, the housing 30 includes a recess such as a groove 130 that extends through the base wall 36 and across the width of the housing 30 between the cavities 50 and 52. The groove 130 may alternatively be formed as a bore extending through the housing 30. The housing 30 is generally symmetrical about the groove 130.

As best shown in FIG. 2, the cargo tie down adapter 26 includes a cargo tie down member such as a cargo ring 132. The cargo ring 132 preferably comprises a generally circular ring having a circular cross section, but may be formed in various other shapes as desired including D-shaped, C-shaped and S-shaped rings. The cargo ring 132 is located in the groove 130 in the housing 30 such that the cargo ring 132 is coupled to the housing 30. The cargo ring 132 is pivotable within the groove 130 with respect to the housing 30 such that the cargo ring 132 can be pivoted approximately 180° from a position as generally shown in FIG. 2 wherein the cargo ring 132 is generally coplanar with the housing 30 and extends around the second slot 100, to a position (not shown) wherein the cargo ring 132 is generally coplanar with the housing 30 and located around the first slot 64. The cargo ring 132 preferably has a sufficiently large diameter such that it does not engage the housing 30 at the first end 32 or the second end 34 when it is pivoted. As shown in FIG. 2, if needed, a shim 134 having a thickness as required may be placed between the housing 30 and the deck 14 of the transport vehicle to locate the cargo tie down adapter 26 at the proper elevation.

As shown in FIG. 2, the housing 30 of the cargo tie down adapter 26 is secured to the deck 14 of the transport vehicle by a pair of threaded screws 136 each having a conical-shaped head. The circular portions 68 and 104 of the slots 64 and 100 are sized such that the head of the screws 136 can pass therethrough. The threaded shank of the screws 136 respectively extend through the bores 86 and 120 in the base wall 36 with the heads of the screws 136 being respectively located within the conical portions 90 and 124 of the bores 86 and 120. Thus when the screws 136 are fully installed, the top surface of the heads of the screws 136 are generally coplanar with, or located slightly below, the interior surface 40 of the base wall 36. The screws 136 are preferably high strength screws such that the cargo tie down adapter 26 can resist a pulling force on the cargo ring 132 of at least ten thousand pounds.

As best shown in FIGS. 3 and 4, the mounting assembly 28 of the cargo tie down system 24 is attached to a containerized cargo conveyance system 140. The mounting assembly 28 includes a base 142 that is adapted to be attached to the cargo conveyance system 140 by a plurality of fasteners 144. A stud 146 extends through the base 142 and is rotatably attached thereto. The stud 146 is selectively rotatable about a central vertical axis 152 between an unlocked position and a locked position. The stud 146 includes a head 148 at its lower end having a pair of radially outwardly extending wings 150. The wings 150 extend outwardly from the stud 146 in opposite directions relative to one another. The wings 150 have a width which is approximately equal to the diameter of the shaft of the stud 146. The diameter of the shaft of the stud 146 and the width of the wings 150 of the stud 146 are sized to be slightly smaller than the width of the rectangular portions 66 and 102 of the slots 64 and 100, such that the head 148 of the stud 146 will fit through the rectangular portions 66 and 102 when the stud 146 is rotated to the unlocked position wherein the wings 150 extend from the shaft of the stud 146 generally parallel to the longitudinal length of the housing 30 between the first end 32 and second end 34 of the housing 30. The tip to tip distance of the wings 150 is longer than the width of the rectangular portions 66 and 102 of the slots 64 and 100, such that when the stud 146 is rotated 90° from the unlocked position to the locked position the wings 150 will not fit through the rectangular portions 66 and 102 and such that the wings 150 will be respectively located within the recess portions 78 and 80 of the cavity 50.

The mounting assembly 28 also includes a knob 156. The shaft of the stud 146 extends concentrically through the knob 156 and the knob 156 is attached to the stud 146 for conjoint rotation therewith. A nut 158 is threadably attached to the upper end of the stud 146. The knob 156 includes a first bore 160 that extends from a circumferential surface of the knob 156 radially inwardly a short distance. The knob 156 also includes a second bore 162 that extends radially inwardly from the circumferential surface of the knob 156 a short distance, which is located approximately 90° from the bore 160 about the axis 152. A groove 164 extends along the circumferential surface of the knob 156 from the bore 160 to the bore 162. The base 142 includes a housing 166 that includes a detent pin 168 having a tip 169 and a spring 170 that resiliently biases the tip 169 of the detent pin 168 outwardly from the housing 166 and into engagement with the knob 156. An actuator knob 172 is attached to the detent pin 168 to permit manual retraction of the detent pin 168 from its extended position, as shown in FIG. 4, wherein the tip 169 of the detent pin 168 engages the knob 156 to a retracted position wherein the tip 169 of the detent pin 158 is removed from the bores 160 or 162.

The knob 156 and the stud 146 are selectively rotatable from a first locked position, as shown in FIGS. 3–5, approximately 90° to the second unlocked position. When the knob 156 and stud 146 are in the locked position as shown in FIGS. 3–5, the tip 169 of the detent pin 168 is located within the bore 160 of the knob 156 to prevent rotation of the knob 156 and the stud 146, and the wings 150 of the stud 146 extend transversely to the longitudinal length of the housing 30. The knob 156 and the stud 146 are rotated to the unlocked position by retracting the detent pin 168 from the knob 156 by use of the actuator knob 172 and rotating the knob 156 in a clockwise direction as shown in reference to FIG. 3. Once the knob 156 has been rotated clockwise such that the bore 160 is no longer aligned with the tip 169 of the detent pin 168, the actuator knob 172 may be released such that the spring 170 biases the tip 169 of the detent pin 168 in the groove 164 of the knob 156. As the knob 156 is continued to be rotated in the clockwise direction the tip 169 of the detent pin 168 will slide along the groove 164 until the second bore 162 is aligned with the tip 169 of the detent pin 168, whereupon the spring 170 will bias the tip 169 of the detent pin 168 into the bore 162 thereby preventing any further rotation of the knob 156 and the stud 146 in any direction about the axis 152. The knob 156 and the stud 146 may be returned to the unlocked position in a similar but reverse manner.

In operation, a plurality of cargo tie down adapters 26 are secured to the deck 14 of a transport vehicle with screws 136. Noncontainerized cargo may be tied down to the deck 14 with the cargo rings 132 of the cargo tie down adapters 26. If containerized cargo is to be transported within the transport vehicle, the cargo conveyance system 140 must be installed. The cargo rings 132 of the cargo tie down adapters 26 are pivoted such that they are generally coplanar with the housing 30. Mounting assemblies 28 are attached to the cargo conveyance system 140 and the studs 146 are rotated to the unlocked position such that the wings 150 on the head 148 of each stud 146 are located longitudinally with respect to the housing 30. The head 148 of each stud 146 is then inserted downwardly through the rectangular portion 66 of a respective slot 64 to locate the head 148 within the cavity 50 of the receptacle 48. The knob 156 and the stud 146 may then be rotated approximately 90° to the locked position wherein the wings 150 of the head 148 extend generally transversely to the housing 30. When the stud 146 is in the locked position, the wings 150 are located within the recess portions 78 and 80 of the cavity 50 between the first lip member 70 and the base wall 36 and between the second lip member 74 and the base wall 36. The lip members 70 and 74 thereby retain the head 48 of the stud 146 within the cavity 50 of the receptacle 48 and prevent removal of the stud 146 from the housing 30. The cargo tie down adapter 26 and the mounting assembly 28 thereby selectively attach and couple the cargo conveyance system 140 to the deck 14 of the transport vehicle without removing the cargo ring 132 from the housing 30. Containerized cargo may then be loaded into the transport vehicle for transport.

The cargo conveyance system 140 may be removed from the deck 14 of the transport vehicle in a reverse manner to allow the shipment of noncontainerized cargo. The knob 156 and stud 146 are rotated from the locked position to the unlocked position such that the wings 150 of the head 148 are no longer located within the recess portions 78 and 80 of the cavity 50. The head 148 of the stud 146 may then be vertically lifted through the rectangular portion 66 of the first slot 64 thereby disengaging the cargo conveyance system 140 from the cargo tie down adapter 26. The cargo tie down adapter 26 is ready for use as a tie down for noncontainerized cargo.

Although the stud 146 has been described herein as being attached to the housing 30 within the first cavity 50 of the receptacle 48 of the cargo tie down adapter 26, the head 148 of the stud 146 may alternatively be located within the second cavity 52 of the receptacle 49 of the housing 30 in a similar manner. Alternatively, a stud 146 may be respectively located within each of the cavities 50 and 52 of the housing 30.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A cargo tie down adapter for use in securing noncontainerized cargo or a containerized cargo conveyance system to a transport vehicle, said cargo tie down adapter comprising:

a cargo tie down member; and a housing adapted to be secured to the transport vehicle, said housing including a base wall, a top wall, a first recess comprising a groove formed in said base wall adapted to receive said cargo tie down member, and a first receptacle for selectively attaching the cargo conveyance system to said housing, said first receptacle including a cavity formed in said housing between said top wall and said base wall, a slot formed in said top wall of said housing in communication with said cavity, and a first lip member formed in said top wall, said cavity including a second recess located between said first lip member and said base wall;

whereby said cargo tie down member is adapted to provide a tie down for noncontainerized cargo and said receptacle is adapted to attach the containerized cargo conveyance system to said housing.

2. The cargo tie down adapter of claim 1 wherein said receptacle includes a second lip member formed in said top wall, said slot extending between said first and second lip members, said cavity including a third recess located between said second lip member and said base wall.

3. The cargo tie down adapter of claim 1 wherein said cargo tie down member comprises a cargo ring.

4. The cargo tie down adapter of claim 1 including a second receptacle for selectively attaching the cargo conveyance system to said housing.

5. The cargo tie down adapter of claim 4 wherein said first recess is located between said first receptacle and said second receptacle.

6. The cargo tie down adapter of claim 1 wherein said base wall of said housing includes a bore in communication with said cavity.

7. The cargo tie down adapter of claim 1 wherein said housing is integrally formed.

8. A cargo tie down adapter for use in securing noncontainerized cargo or a containerized cargo conveyance system to a transport vehicle, said cargo tie down adapter comprising:

a housing extending longitudinally between a first end and a second end, said housing including a base wall adapted to be connected to the transport vehicle, a top wall spaced apart from said base wall, a first cavity formed between said base wall and said top wall, and a second cavity formed between said base wall and said top wall, said second cavity being separated from said first cavity, said top wall including a first lip member, a second lip member and a first slot located between said first and second lip members, said first slot extending through said top wall in communication with said first cavity, said first cavity including a first recess located between said base wall and said first lip member and a second recess located between said base wall and said second lip member, said top wall including a third lip member, a fourth lip member and a second slot located between said third and fourth lip members, said second slot extending through said top wall in communication with said second cavity, said second cavity including a third recess located between said base wall and said third lip member and a fourth recess located between said base wall and said fourth lip member; and a cargo tie down member adapted to be coupled to said housing;

whereby said cargo tie down member is adapted to provide a tie down for noncontainerized cargo and said housing is adapted to attach the containerized cargo conveyance system to the transport vehicle.

9. The cargo tie down adapter of claim 8 wherein said first slot includes a generally rectangular portion located between said first and second lip members and a generally circular portion such that said first slot is generally key-hole shaped.

10. The cargo tie down adapter of claim 9 wherein said base wall includes an aperture generally concentrically aligned with said circular portion of said first slot, said aperture adapted to receive a fastener for fastening said housing to the transport vehicle.

11. The cargo tie down adapter of claim 8 wherein said first cavity is located at said first end of said housing and said second cavity is located at said second end of said housing.

12. The cargo tie down adapter of claim 11 wherein said housing includes a fifth recess adapted to receive said cargo tie down member.

13. The cargo tie down adapter of claim 12 wherein said fifth recess comprises a groove located between said first and second cavities.

14. The cargo tie down adapter of claim 8 wherein said cargo tie down member comprises a cargo ring.

15. The cargo tie down adapter of claim 8, wherein said first slot includes a generally rectangular portion located between said first and second lip members and a generally circular portion such that said first slot is generally key-hole shaped and said second slot includes a generally rectangular portion located between said third and fourth lip members and a generally circular portion such that said second slot is generally key-hole shaped.

16. The cargo tie down adapter of claim 15 wherein said base wall includes a first aperture generally concentrically aligned with said circular portion of said first slot and a second aperture generally concentrically aligned with said circular portion of said second slot.

* * * * *